April 7, 1964 P. BERGVALL ETAL 3,127,749
THERMOELECTRIC REFRIGERATION
Filed April 10, 1962 3 Sheets-Sheet 1

INVENTORS
Pär Bergvall
BY Kai Manne Börje Siegbahn
Edmund O. Venander
their ATTORNEY

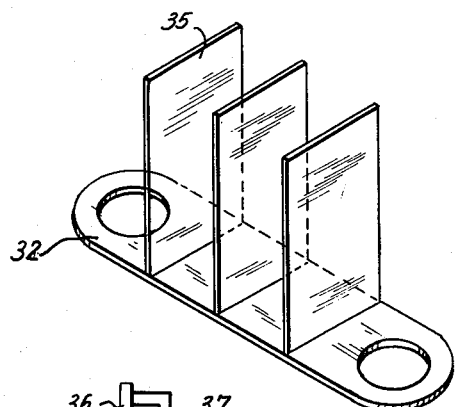
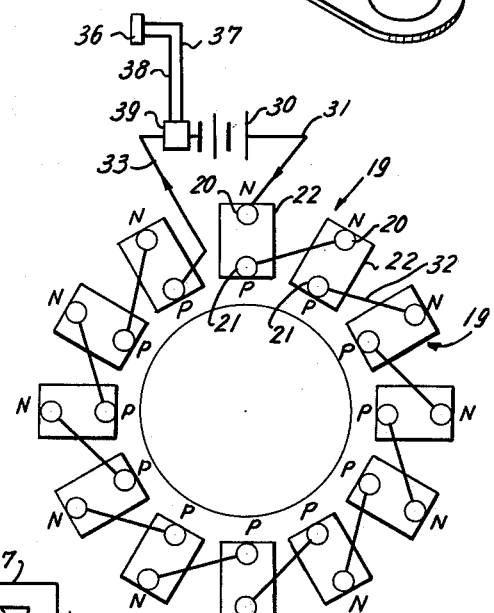
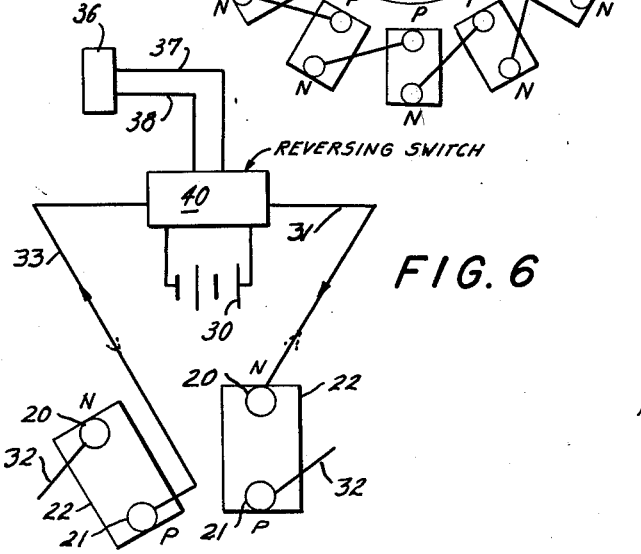

April 7, 1964 P. BERGVALL ETAL 3,127,749
THERMOELECTRIC REFRIGERATION
Filed April 10, 1962 3 Sheets-Sheet 3

INVENTORS
Pär Bergvall
BY Kai Monne Börje Siegbahn
Edmund Fenander
ATTORNEY

3,127,749
THERMOELECTRIC REFRIGERATION
Pär Bergvall, Uppsala, Sweden, and Kai M. B. Siegbahn, Berkeley, Calif., assignors to Aktiebolaget Electrolux, Stockholm, Sweden, a corporation of Sweden
Filed Apr. 10, 1962, Ser. No. 186,441
Claims priority, application Sweden Apr. 13, 1961
14 Claims. (Cl. 62—3)

Our invention relates to thermoelectric refrigerators, and more particularly to a refrigeration device employing the Peltier effect to effect cooling.

Electron multipliers and photo-multipliers are excellent aids for studying and recording corpuscular radiation and for making light measurements. Electron multipliers are used for recording electron beams in defraction measurements and for counting individual particles from radioactive preparations. The electrons are accelerated against a series of electrodes, which are referred to as dynodes, between which an electric potential is applied. An impinging accelerated electron expels several secondary electrons at each dynode, which results in a high amplification of the original charge at the last dynode.

For recording small amounts of light, electron multipliers are provided with a light-sensitive photo-cathode from which visible light expels electrons which are multiplied in the manner just described. In the nuclear-physical detection of radioactive radiation, the photo-multiplier generally is employed with a scintillator in which the ionized radiation emits flashes of light. The intensity of the flashes of light are proportional to the energy of the radiation and the proportionality is retained in the photo-multiplier which records the light. Equipment of this type is referred to as a scintillation counter which possesses valuable energy-discriminating properties.

In the applications referred to above, electrons are released from the cathodes and dynodes even without external initiation because of the thermal motion in the electrodes. These electrons constitute a disturbing background when studies of the character described above are being made, which is quite pronounced when the amounts of energy involved are small. The number of electrons liberated by thermal motion depends to a large extent on temperature in accordance with the Richardson-Dushman equation $$I = A \cdot T^2 e^{-\frac{E}{kT}}$$

wherein $T$ = Temperature in degrees Kelvin
$I$ = Number of electrons liberated per unit of surface and interval of time
$A$ = Proportionality constant
$E$ = The work function
$k$ = Boltzman constant Since temperature in the above equation appears exponentially, the disturbing background in an electronic or photo-multiplier tube, which is often referred to as dark current, can be reduced substantially by moderate cooling, such as to a temperature of about $-10°$ to $-30°$ C., for example. It has been the practice heretofore to effect this cooling by freezing mixtures or the circulation of a freezing medium like liquid air, for example. This is objectionable because it is difficult to provide the freezing mixture or medium in the small amounts required. Also, the cooling of the multiplier to the desired low temperature before a particular study can be started is time-consuming when these cooling agents are employed, and, when a study is in progress, it is difficult to maintain the multiplier at the desired temperature.

The object of our invention is to provide an improved thermoelectric refrigeration device for cooling electron multipliers that will not produce any objectionable disturbing influence.

Another object is to provide an improved thermoelectric refrigeration device to effect cooling without the production of objectionable magnetic fields. We accomplish this by providing a thermoelectric refrigeration device having a group of thermoelectric elements forming a linear thermopile of annular shape having one one side inner cold junctions defining an inner core and on the other side outer hot junctions defining an outer rim encircling the inner core, and connecting the thermoelectric elements in a circuit to provide a path of flow for current through the thermopile which is substantially in the form of a spiral at the surface of a toroid.

The above and other objects and advantages of our invention will become apparent as the following description proceeds, and the features of novelty which characterize the invention will be pointed out with particularity in the claims annexed to and forming a part of this specification.

For a better understanding of the invention, reference may be had to the following description taken in connection with the accompanying drawing, in which:

FIG. 4 is an enlarged perspective view of details shown in FIG. 3;

Figure 1:
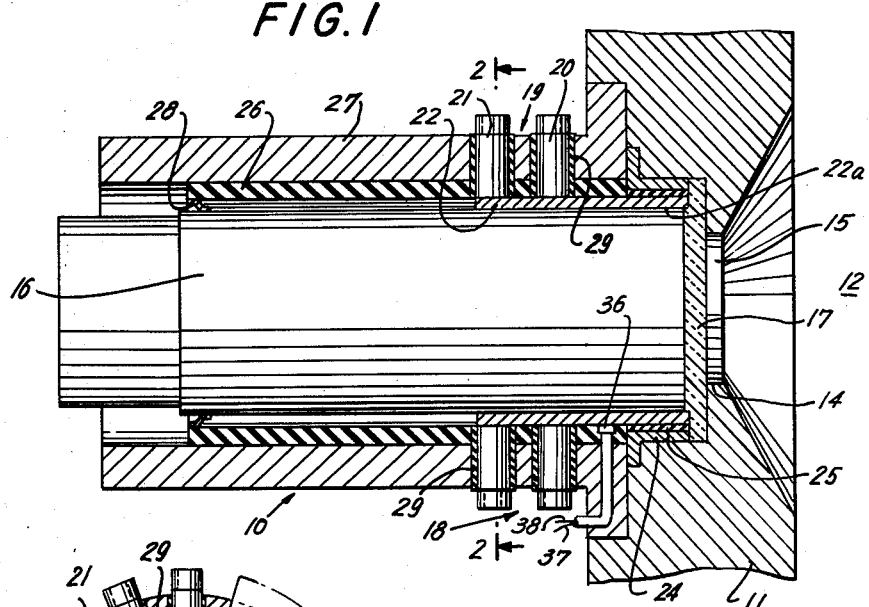
FIG. 1 is a sectional view of apparatus embodying our invention.
Figure 2:
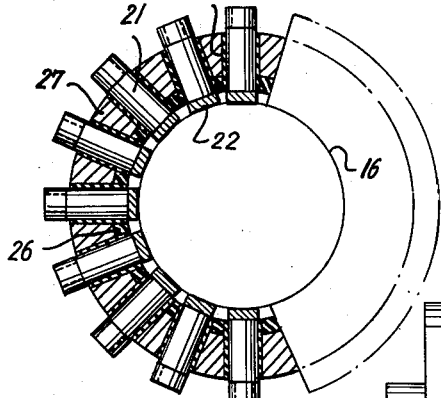
FIG. 2 is a view taken at line 2—2 of FIG. 1.
Figure 7:
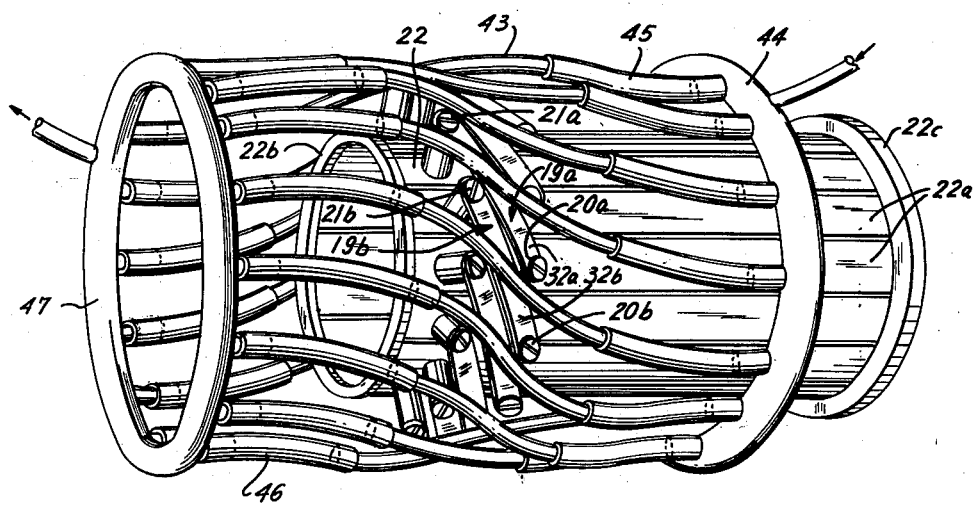
Figure 8:
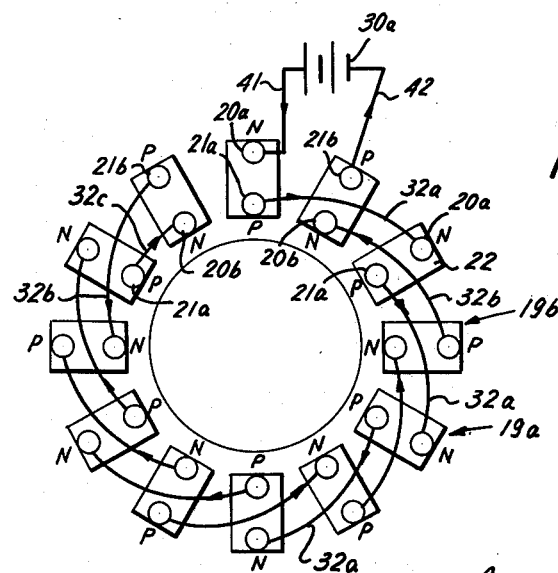

FIG. 5 diagrammatically illustrates the electrical connections for the apparatus shown in FIGS. 1 to 4;

FIG. 6 is a fragmentary view diagrammatically illustrating a modification of the electrical connections shown in FIG. 5;

FIG. 7 is a perspective view of apparatus like that shown in FIGS. 1 and 2 illustrating a modification of the invention; and FIG. 8 diagrammatically illustrates the electrical connections for the apparatus shown in FIG. 7.

Referring to FIGS. 1 and 2, we have shown our invention in connection with a beta spectrometer 10 having a wall 11 defining a chamber 12 which is adapted to be maintained under high vacuum and within which is produced a radiation whose intensity is to be measured. The wall 11 is formed with an opening 14 in which a scintillator 15 is disposed. An electron multiplier 16, which can be of any well-known construction, is positioned against a glass disk or plate 17 located behind the scintillator 15.

In accordance with our invention, in order to cool the electron multiplier 16, especially its parts closely adjacent to the glass plate 17, we provide a cooling device 18 which is disposed about the electron multiplier and comprises a linear thermopile 19 of annular form having a ring of elements 20 and 21 connected and arranged to produce cooling by the so-called Peltier effect. The elements or bars 20 and 21 are formed respectively of negative and positive semiconductor materials, and each pair is fixed, as by soldering, to an elongated metal bridge element 22, which may be formed of copper, for example, having a part 22a which projects beyond the bars 20 and 21, the part 22a constituting a major portion of the length of the bridge element 22.

The bridge elements 22, which form the inner cold junctions of the thermopile 19 are disposed about the electron multiplier 16 in good heat conductive relation therewith. A ring-shaped fitting 24 in the wall 11, which bears against the glass plate 17, is electrically and thermally insulated from the parts 22a of the bridge elements 22 by an insulating sleeve 25. The elements 20 and 21 extend radially outward through aligned openings in inner and outer cylinders 26 and 27 formed respectively of insulating material and metal, the inner insulating cylinder, which forms a lining for the outer cylinder 27, overlying the bridge elements 22 and being held in position at its outer end about the electron multiplier 16 by a ring-shaped spacer member or sealing ring 28. The elements 20 and 21 are electrically insulated from the inner and outer cylinders 26 and 27 by suitable hollow sleeves 29 which may also serve as fittings for holding the elements in position. The outer free ends of the elements 20 and 21 may be provided with suitable terminals (not shown) for connecting them to one another in an electrical circuit in the manner shown in FIG. 5.

Figure 3:
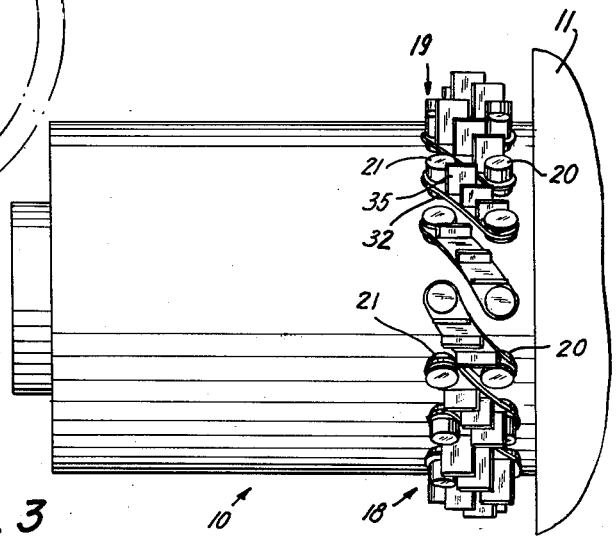
FIG. 3 is a top plan view of the apparatus illustrated in FIG. 1 showing certain details that are omitted from FIG. 1.

FIG. 5 diagrammatically illustrates the bridge elements 22 as being disposed in a single plane rather than as the spaced bars of a cylindrical-shaped linear thermopile. The outer ends of the elements 20 and 21 are connected serially to a direct current source of electrical energy 30, the current flowing from the positive side of the source of electrical energy 30 through a conductor 31 to the first element 20. In each pair of elements 20 and 21 the current passes from the element 20 to the element 21 through the associated bridge element 22, and flows in a clockwise direction in FIG. 5 from the element 21 of one pair of elements 20 and 21 to the element 20 of the adjacent pair of elements through a conductor 32. Current flows from the element 21 of the last pair of elements 20 and 21 through a conductor 33 to the negative side of the source of electrical energy 30. As current flows from the source of electrical energy 30 through the elements 20 and 21 and bridge elements 22 in a clockwise direction in FIG. 5, in the manner just described, heat is abstracted from the electron multiplier 16 by the bridge elements 22 which are in heat conductive relation therewith and form the inner cold junctions of the linear thermopile. The heat abstracted from the electron multiplier in this manner is given up to a cooling medium flowing in thermal relation with the outer hot junctions of the thermopile, which may be in the form of copper bars, as shown in FIGS. 3 and 4, which serve as the electrical conductors 32 for connecting the elements 21 and 20 of adjacent pairs of elements 20 and 21. When copper bars are employed as the electrical conductors 32 in the embodiment being described, the bars may be formed with fins 35 to provide a relatively extensive heat transfer surface to promote the giving up of heat to a cooling medium such as ambient air, for example, which may flow either by natural or forced draft in thermal relation with the bars.

A thermal sensitive member 36, which is in thermal relation with one or more bridge elements 22 and hence influenced by the low temperature produced at the cold junctions of the thermopile 19, is connected by conductors 37 and 38 to a control device 39 which is connected in conductor 33, as illustrated in FIG. 5. The thermal member 36 responds to a temperature condition affected by at least one of the cold junctions of the thermopile to operate control device 39 to close and open the circuit for the thermopile 19 when the temperature of the cold junctions tends to rise and fall, respectively, above and below a definite low temperature.

In FIG. 6 we have shown another manner of controlling the low temperature produced by the thermopile 19, in which the thermal sensitive member 36 is connected by conductors 37 and 38 to a control device 40 which embodies a reversing switch for connecting the direct current source of electrical energy 30 to the thermopile 19 so that current will flow from the positive side of the source of electrical energy 30 either in one direction indicated by the arrows in solid lines or in the opposite direction indicated by the arrows in dotted lines. In FIG. 6 the thermal member 36 operates control device 40 so that direct current will flow from the positive side of the source of electrical energy 30 either through conductor 31 or 33 to the thermopile 19 to control the cooling effect produced by the thermopile 19.

Another embodiment of the invention is shown in FIG. 7 in which parts similar to those illustrated in FIGS. 1 to 3 are referred to by the same reference numerals. In FIG. 7 the bridge elements 22 are held in spaced relation by end rings 22b and 22c formed of suitable electrical insulating material. The elements 20a, 20b and 21a, 21b, whose inner surfaces are fixed to the bridge elements 22, form the thermoelectric elements of two thermopiles 19a and 19b. As best shown in FIG. 8, a first group of alternate pairs of elements are connected by conductors or bars 32a to provide the thermopile 19a, and the second group of alternate pairs of elements are connected by conductors or bars 32b to provide the thermopile 19b.

As shown in FIG. 8, the current flows in one direction through the elements 20a and 21a in the thermopile 19a and in the opposite direction through the elements 20b and 21b in the thermopile 19b. The current flows from the positive side of the direct current source of electrical supply 30a through a conductor 41 to the first element 20a of the thermopile 19a. The current flows in a clockwise direction through alternate pairs of elements from the element 21a of one pair of elements 20a and 21a to the element 20a in the next pair of elements 20a and 21a through a conductor or bar 32a. Accordingly, the bars 32a connect successive pairs of elements 20a and 21a in the thermopile 19a and pass over a pair of elements 20b and 21b connected in the other thermopile 19b. Current flows from the positive element 21a of the last pair of elements 20a and 21a in the thermopile 19a through a conductor or bar 32c to the negative element 20b in the first pair of elements 20b and 21b in the thermopile 19b.

The current flows in a counter-clockwise direction through alternate pairs of elements from the positive element 21b of one pair of elements 20b and 21b to the negative element 20b in the next pair of elements 20b and 21b through a conductor or bar 32b. Accordingly, the bars 32b connect successive pairs of elements 20b and 21b in the thermopile 19b and pass over a pair of elements 20a and 21a connected in the other thermopile 19a. Current flows from the element 21b of the last pair of elements 20b and 21b in the thermopile 19b through a conductor 42 to the negative side of the source of electrical energy 30a.

As current flows in a clockwise direction through the thermopile 19a and in a counter-clockwise direction through the thermopile 19b, as seen in FIG. 8, heat is abstracted from the object to be cooled by the bridge elements 22 which are in thermal transfer relation therewith and form the cold junctions of the thermopiles 19a and 19b. The heat abstracted from the object to be cooled, such as the electron multiplier 16 shown in FIGS. 1 to 3, is given up to a cooling medium flowing in thermal relation with the conductors or bars 32a, 32b and 32c, which form the hot junctions of the thermopiles 19a and 19b.

The cooling medium may be a cooling liquid which is circulated through metallic pipe sections 43 that may be formed of copper, for example, and heat conductively fixed, as by soldering, to the conductors or bars 32a, 32b and 32c, as shown in FIG. 7. The cooling liquid is delivered from a suitable source of supply to a circular inlet manifold 44 to which are connected the ends of flexible tubes 45, the opposite ends of which are connected to the pipe sections 43. The cooling liquid flows from the pipe sections 43 through flexible tubes 46 which are connected to a circular outlet manifold 47 from which the cooling liquid is conducted either to waste or to a place of cooling for recirculation through the pipe sections 43 after being cooled. The inlet and outlet manifolds 44 and 47 and the flexible tubes 45 and 46 desirably are formed of electrical insulating material.

In the embodiments of the invention described above paths of flow for current are provided in the thermopiles which are substantially in the form of spirals at the surfaces of toroids. We have found that thermopiles of this type are satisfactory for cooling instruments like electron multipliers, for example, because cooling is effected without the production of objectionable magnetic fields that tend to impair the usefulness of the instruments. Objectionable magnetic fields are reduced further when two thermopiles 19a and 19b are employed in the manner shown in FIG. 8 and the paths of flow of current in both are substantially in the form of spirals at the surfaces of toroids and the currents flow through the thermopiles in opposite directions.

By forming the metallic cylinder 27 in FIG. 1 of a material like soft iron, for example, the electron multiplier or other instrument to be cooled is magnetically shielded from the magnetic field produced by the thermopile 19. If desired, another cylinder member formed of suitable material can be provided between the bridge elements 22 and the object to be cooled to effect additional magnetic shielding.

Although we have illustrated and described particular embodiments of our invention, we desire not to be limited to the particular arrangements set forth, and we intend in the following claims to cover all modifications which do not depart from the spirit and scope of the invention.

We claim:

1. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, and means for connecting said elements in a circuit to provide a path of flow for current through the thermopile which is substantially in the form of a spiral at the surface of a toroid.

2. A thermoelectric refrigeration device comprising a pair of linear thermopiles of annular form having cold and hot junctions on their opposite sides, the pair of thermopiles including two groups of thermoelectric elements, pairs of elements of one thermopile being disposed between pairs of elements of the other thermopile, the cold junctions of both thermopiles being on their inner sides and defining an inner core and the hot junctions of both thermopiles being on their opposite outer sides and defining a rim encircling the inner core, means for connecting the elements of one thermopile to provide a path of flow for current therethrough in one direction which is substantially in the form of a spiral at the surface of a toroid, and means for connecting the elements of the other thermopile to provide a path of flow for current therethrough in the opposite direction which is substantially in the form of a spiral at the surface of a toroid.

3. A refrigeration device as set forth in claim 1 in which said connecting means includes conductors, the hot and cold junctions of the thermopile being formed by said conductors which connect the elements on its opposite sides, the conductors forming the cold junctions comprising members extending lengthwise of the axis of the inner core.

4. A refrigeration device as set forth in claim 3 in which the members forming the cold junctions have essentially smooth inner surfaces and collectively define a hollow body having an inner wall of cylindrical form.

5. A refrigeration device as set forth in claim 3 in which the members forming the cold junctions comprise elongated rods which are parallel to one another and to the axis of the inner core and have essentially smooth inner surfaces and collectively define a hollow body having an inner wall of cylindrical form.

6. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile which is substantially in the form of a spiral at the surface of a toroid, said connecting means including conductors, the hot and cold junctions being formed by said conductors which connect the elements on opposite sides of the thermopile, the conductors forming the cold junctions comprising elongated rods which are parallel to one another and to the axis of the inner core and have essentially smooth inner surfaces and collectively define a hollow body having an inner wall of cylindrical form, the elements comprising pairs of semiconductor bars of different type extending radially outward from the inner core, the bars of each pair having their inner surfaces fixed to the outer surface of a different one of the rods, and a major part of each rod projecting axially of the inner core beyond the region of the semiconductor bars are fixed thereto.

7. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile, said connecting means including conductors, the hot and cold junctions being formed by said conductors which connect the elements on opposite sides of the thermopile, a metallic cylinder enveloping the object to be cooled by the cold junctions, the elements comprising pairs of semiconductor bars of different type extending radially outward from the inner core, the bars of each pair having their inner surfaces fixed to a different one of the conductors forming a cold junction, the cylinder having openings through which the semiconductor bars extend and at which regions they are fixed to the cylinder, and means including the cylinder for magnetically shielding the object to be cooled from the magnetic field produced by the circuit.

8. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile, and means for magnetically shielding the object to be cooled by the cold junctions from the magnetic field produced by the circuit, the shielding means comprising a metallic cylinder within which the cold junctions are disposed.

9. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile which is substantially in the form of a spiral at the surface of a toroid, said connecting means including conductors, the hot and cold junctions being formed by said conductors which connect the elements on opposite sides of the thermopile, the conductors forming the hot junctions having relatively extensive heat transfer surfaces to promote dissipation of heat therefrom to a cooling medium flowing in thermal transfer relation therewith.

10. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile which is substantially in the form of a spiral at the surface of a toroid, said connecting means including conductors, the hot and cold junctions being formed by said conductors which connect the elements on opposite sides of the thermopile, piping heat-conductively connected to the conductors forming the hot junctions, and means for flowing a cooling fluid through the piping.

11. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile which is substantially in the form of a spiral at the surface of a toroid, said connecting means including conductors, the hot and cold junctions being formed by said conductors which connect the elements on opposite sides of the thermopile, piping formed of good heat-conductive material in thermal relation with the conductors forming the hot junctions, and means for circulating a cooling fluid through the piping said last-mentioned means including tubing formed of electrically insulating material which is connected to deliver and carry away cooling fluid to and from the piping.

12. A thermoelectric refrigeration device comprising a linear thermopile of annular form having inner cold junctions on one side of the thermopile defining an inner core and outer hot junctions on the other side of the thermopile defining an outer rim encircling the inner core, the thermopile including a group of thermoelectric elements, means for connecting said elements in a circuit to provide a path of flow for current through the thermopile which is substantially in the form of a spiral at the surface of a toroid, and means associated with the circuit for controlling the temperature produced at the cold junctions.

13. A refrigeration device as set forth in claim 12 in which said control means includes a member responsive to a temperature condition affected by at least one of the cold junctions for controlling the current in the circuit.

14. A refrigeration device as set forth in claim 13 in which said control means includes provisions whereby the member reverses the direction of the flow of current in the circuit responsive to a temperature condition affected by at least one of the cold junctions.

References Cited in the file of this patent
UNITED STATES PATENTS

| | | |
|---|---|---|
| 2,837,899 | Lindenblad | June 10, 1958 |
| 2,959,017 | Gilman | Nov. 8, 1960 |
| 2,959,925 | Frantti | Nov. 15, 1960 |
| 3,004,393 | Alsing | Oct. 17, 1961 |
| 3,052,100 | Homkes | Sept. 4, 1962 |
| 3,054,840 | Alsing | Sept. 18, 1962 |